United States Patent [19]

Mayer

[11] Patent Number: 4,846,327
[45] Date of Patent: Jul. 11, 1989

[54] DRIVE ARRANGEMENT FOR COMPRESSOR OF A TRANSPORT REFRIGERATION UNIT

[75] Inventor: Donald K. Mayer, Bloomington, Minn.

[73] Assignee: Thermo King Corporation, Minneapolis, Minn.

[21] Appl. No.: 741,089

[22] Filed: Jun. 4, 1985

[51] Int. Cl.⁴ .............................................. F16D 27/00
[52] U.S. Cl. .............................. 192/84 C; 192/84 A; 192/105 C
[58] Field of Search ............. 192/84 C, 84 A, 84 AA, 192/105 C, 105 BA

[56] References Cited

U.S. PATENT DOCUMENTS

| | | | |
|---|---|---|---|
| 2,513,798 | 4/1950 | Hatfield | 192/105 CD |
| 2,639,794 | 5/1953 | McNairy | 192/105 CD X |
| 2,975,614 | 3/1961 | McGuffey | 62/230 |
| 3,208,571 | 9/1965 | Bochory | 192/105 CD |
| 3,426,877 | 2/1969 | Cancilla, Jr. | 192/105 CD |
| 3,512,373 | 5/1970 | White | 62/228 |
| 3,545,222 | 12/1970 | Petranek | 62/236 |
| 3,718,214 | 2/1973 | Newman | 192/105 CD |
| 3,789,618 | 2/1974 | Feliz | 62/236 |
| 3,842,378 | 10/1974 | Pierce | 192/84 A X |
| 3,844,130 | 10/1974 | Wahnish | 62/133 |
| 4,488,627 | 12/1984 | Strerch et al. | 192/84 C X |
| 4,567,975 | 2/1986 | Roll | 192/84 C |

FOREIGN PATENT DOCUMENTS

| | | | |
|---|---|---|---|
| 2123749 | 11/1972 | Fed. Rep. of Germany | 192/105 CD |
| 2341208 | 2/1975 | Fed. Rep. of Germany | 192/84 A |
| 156950 | 12/1979 | Japan | 192/84 C |
| 51914 | 4/1980 | Japan | 192/84 A |
| 573641 | 9/1977 | U.S.S.R. | 192/84 C |
| 475849 | 11/1937 | United Kingdom | 192/105 BA |

Primary Examiner—Dwight G. Diehl
Attorney, Agent, or Firm—D. R. Lackey

[57] ABSTRACT

For a transport refrigeration unit having a refrigerant compressor 14 adapted to be driven alternatively by an engine 10 through belt 52, or by electric motor 12 through belt 58 has the clutch 36 mounted to the compressor 14 with both the engine 10 having a rigid pulley 38 on its output and the motor 12 having the rigid pulley 40 on its output.

3 Claims, 3 Drawing Sheets

DRIVE ARRANGEMENT FOR COMPRESSOR OF A TRANSPORT REFRIGERATION UNIT

BACKGROUND OF THE INVENTION

This invention pertains to the art of drive arrangements for driving the compressor of a transport refrigeration unit when the unit is of the type in which the compressor is driven either by an internal combustion engine drive or, alternatively, by an electric motor drive.

One conventional arrangement for providing either internal combustion drive or electric motor drive for a refrigerant compressor of a transport refrigeration unit includes an internal combustion engine such as a diesel driving the compressor through a centrifugal clutch typically connected to the engine flywheel and a belt extending to the compressor, and an electric motor which can also drive the compressor through a belt when the engine is not running and the clutch is disengaged. The engine-mounted clutch experiences rapid wear and premature deterioration in many cases, particularly in connection with small diesel engines, due principally to the intense torsional oscillation that is characteristic of such engines.

The aim of this invention is to provide a belt drive and clutch arrangement intended to reduce the deterioration of the clutch from engine torsional oscillations and extend the useful life of the clutch.

SUMMARY OF THE INVENTION

In accordance with the invention, for a transport refrigeration unit in which a refrigerant compressor is selectively belt drivable by either an internal combustion engine output through a clutch, or from an electric motor output, a driving arrangement for the compressor is provided comprising a rigid pulley on the engine output and a rigid pulley on the motor output, and a clutch having two separate pulleys including a first pulley directly supported from the compressor housing through bearing means having an inner race stationarily attached to the housing, the first clutch pulley being connected to be driven through belt means from the engine pulley, and a second clutch pulley directly attached to the shaft of the compressor and being connected to be driven through belt means from the motor pulley, and further including means selectively operable in accordance with engine operation and nonoperation to effect engagement and disengagement, respectively, of the clutch.

DESCRIPTION OF THE PREFERRED EMBODIMENTS

Figure 1:
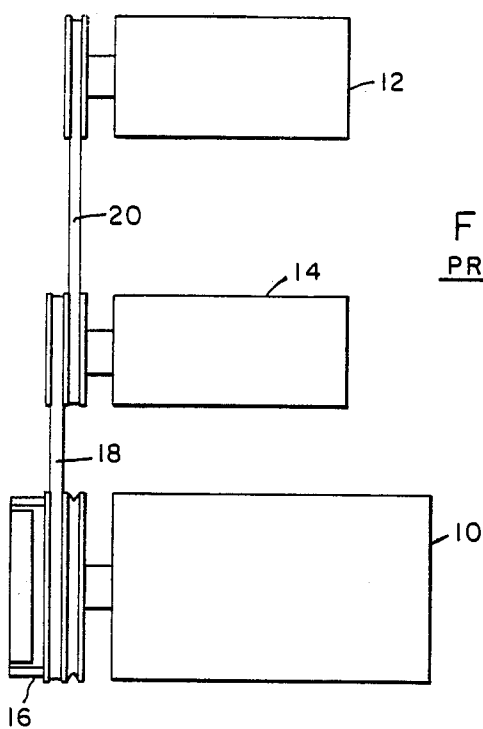
FIG. 1 is a somewhat schematic view of a typical prior art arrangement in which a clutch is associated with the internal combustion engine.

In the prior art FIG. 1 view, a typical arrangement is shown in which an engine 10, or alternatively an electric motor 12, may drive a compressor 14 in a transport refrigeration unit. When the engine is operating, its output is transmitted through the clutch 16 and belt 18 to drive the compressor. When the engine is not running, the clutch 16 is disengaged and the compressor 14 is driven directly through belt 20 from the motor 12, while the clutch drum free-wheels.

Figure 2:
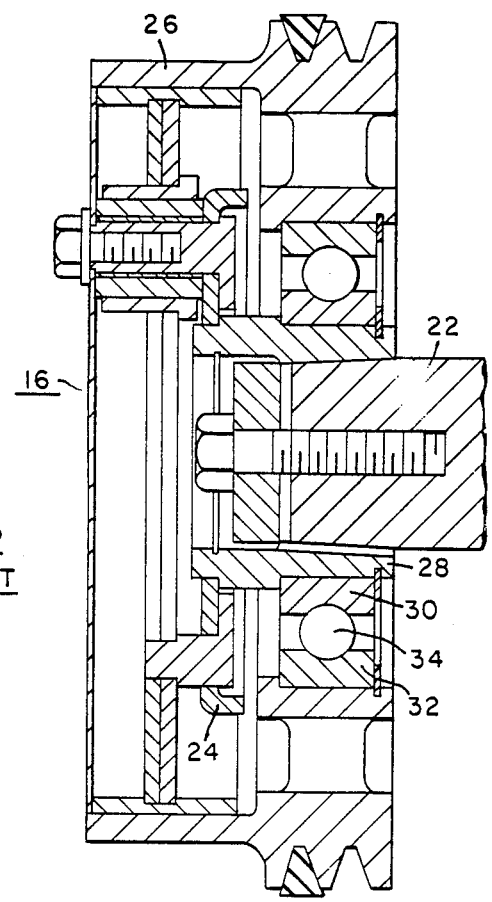
FIG. 2 is a sectional view of a conventional prior art clutch as mounted on an engine.

In FIG. 2, details of a typical centrifugal clutch driven by the engine output 22 are shown. The clutch shoe carrier part 24 of the clutch is driven by the engine output 22 to which it is directly attached. The drum part 26 of the clutch is supported from the hub 28 through bearing means which include an inner race 30, an outer race 32, and the ball bearings 34.

With the engine-mounted clutch of FIG. 2, when the clutch is engaged during engine operation both the inner and outer bearing races 30 and 32 are rotating with no relative rotation therebetween. Since both bearing races rotate at the same rate, the individual balls within the bearing do not rotate. The combined vibration and torsional oscillation of the engine, and hypocyclic bearing slip, generate a hostile environment resulting in friction oxidation or frettage corrosion of the essentially motionless bearing balls and adjoining races.

Figure 3:
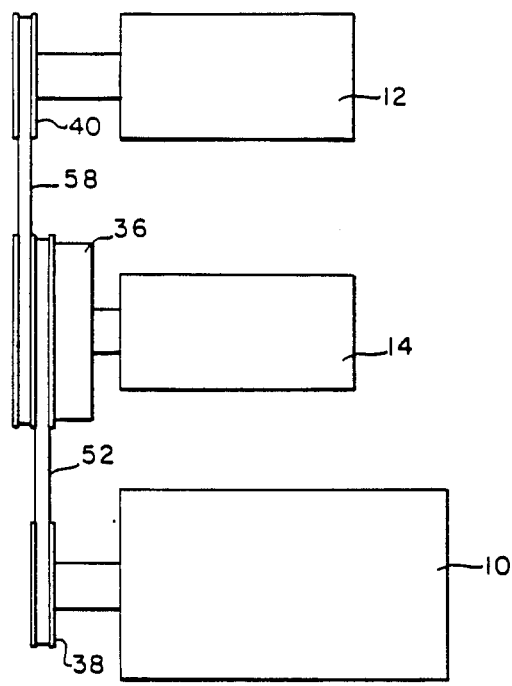
FIG. 3 is a somewhat schematic view of the belt drive and clutch arrangement of the invention.

In accordance with the invention, as shown in FIG. 3, a clutch 36 is compressor mounted and a rigid pulley 38 is engine mounted and a rigid pulley 40 is mounted on the output of the electric motor.

Figure 4:
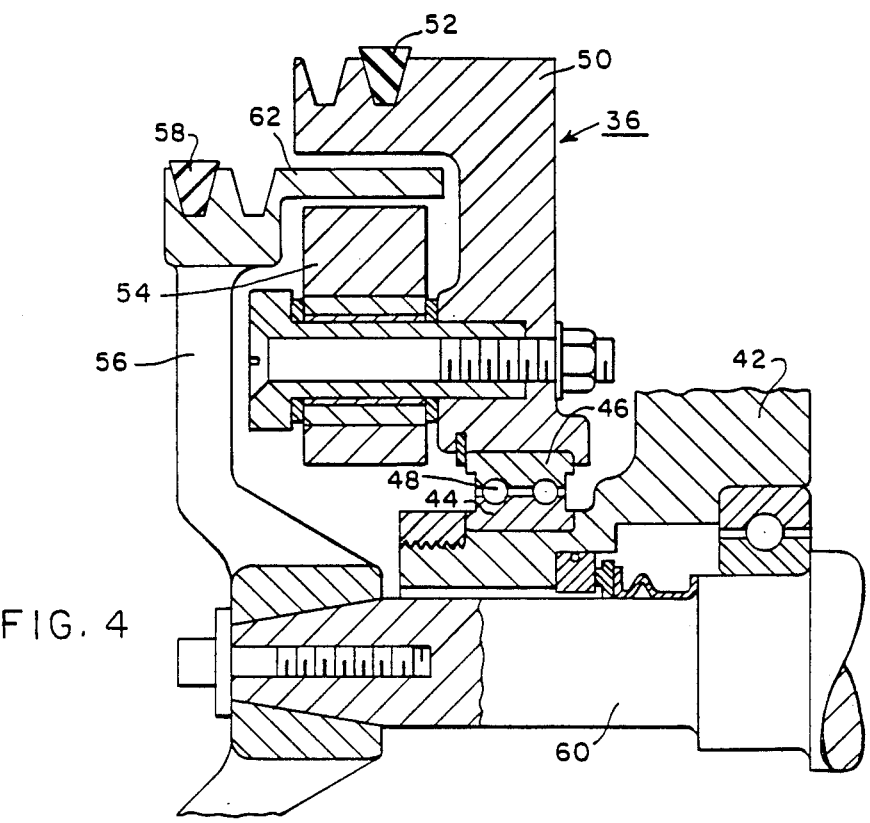
FIG. 4 is a fragmentary sectional view of a centrifugal clutch mounted on a compressor.

A centrifugal clutch 36 in its mounting arrangement relative to the compressor is shown in FIG. 4. The stationary compressor seal plate 42 supports a bearing assembly including an inner race 44, an outer race 46, and intervening ball bearings 48, the bearing means in turn supporting the first pulley 50 which is connected through belt means 52 to be driven from the engine. The pulley 50 carries the conventional centrifugally movable shoes 54 which pivot radially outwardly when the pulley 50 rotates at or above a given speed.

The centrifugal clutch of FIG. 4 also includes a second clutch pulley 56 which is adapted to be driven from the electric motor 12 through belt 58 and is directly attached to the compressor shaft 60 and includes a drum part 62 which is contacted by the shoes 54 when the clutch is in an engaged condition.

When the engine 10 is operating, the first pulley 50 is rotating and the shoes 54 engage the drum 62 of the second pulley which in turn drives the compressor through the shaft 60. Under this condition, it will be seen that the bearing inner race 44 is stationary while the outer race is rotating and the relative rotation of the bearing balls 48 takes place.

Alternatively, when the engine is not operating, the pulley 50 is stationary and the pulley 56 rotates to drive the compressor from the motor 12. In this situation, both the inner and outer races of the bearing and the intervening balls 48 are stationary.

The compressor-mounted clutch 36 also benefits from the torsional shock isolation provided by the resilient belt 52 between the engine 10 and the compressor 14. A substantial portion of the torsional oscillation and vibration experienced by the engine-mounted clutch of the prior art in FIG. 1 is absorbed through the belt 52 before exposure to the compressor-mounted clutch.

The shoes 54 in the compressor-mounted clutch also enjoy further isolation from engine torque oscillation by the flywheel inertia of the engine-driven-shoe-carrier pulley 50.

An incidental benefit for the engine 10 crankshaft bearing derives from the reduced weight on the engine flywheel, since only a lightweight pulley 38 need be added to the flywheel.

Figure 5:
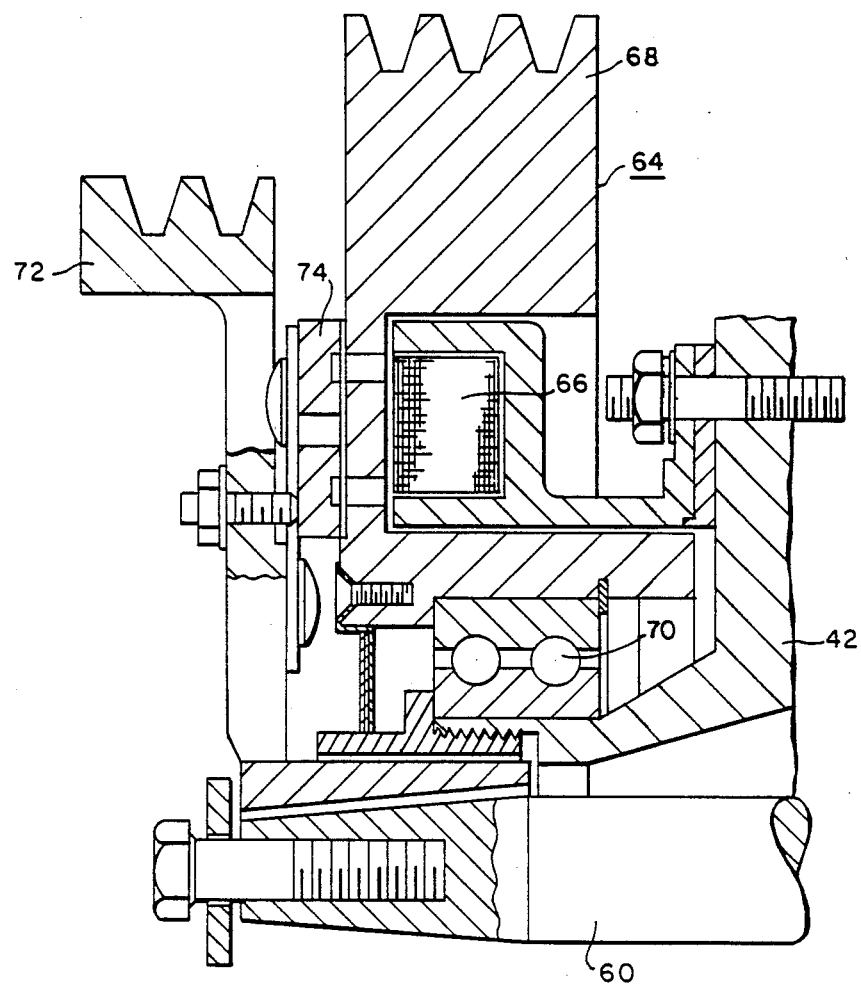
FIG. 5 is a fragmentary sectional view of an electric clutch which may be used in accordance with the principles of the invention.

The benefits of the invention are also available with an electrically operated clutch 64 as shown in FIG. 5. The electric clutch itself is conventional and includes a field coil 66 which is stationary and mounted to the compressor body 42 and fits in a recess of the engine rotatable first pulley 68 which is rotatably supported from the compressor body 42 through the bearing assembly 70. The motor driven pulley 72 is fixedly attached to the compressor shaft 60 and carries the spring attached armature 74 which is adapted to be drawn toward the field coil 66 when the coil is energized, to lock the pulleys 68 and 72 together.

The same advantage with respect to the bearings 70, and other advantages mentioned in connection with the centrifugal clutch, are available with the electric clutch.

I claim:

1. For a transport refrigeration unit in which a refrigerant compressor is selectively belt drivable by either an internal combustion engine output through a clutch or from an electric motor output, a driving arrangement for said compressor, comprising:
   a pulley rigidly fixed on said engine output;
   a pulley rigidly fixed on said motor output;
   a clutch having two separate pulleys including,
   a first clutch pulley directly supported from the housing of said compressor through a bearing means having an inner race stationarily attached to said housing, said first clutch pulley being connected to be driven through belt means from said engine pulley,
   a second clutch pulley directly attached to the shaft of said compressor and independently of any bearing support of said second pulley from said shaft, and being connected to be driven through belt means from said motor pulley, and
   further including means selectively operable in accordance with engine operation and non-operation to effect engagement and disengagement, respectively, of said clutch,
so that said first clutch pulley is stationary when said compressor is motor driven and said first and second clutch pulleys both rotate when said compressor is engine driven.

2. An arrangement according to claim 1 wherein:
said selectively operable means includes centrifugally movable clutch shoe means carried by said first clutch pulley and operable to contact said second clutch pulley in response to said engine operating at or above a given speed.

3. An arrangement according to claim 1 wherein:
said selectively operable means includes an electrically operable field coil and said second clutch pulley includes an armature adapted to be drawn toward said field coil to lock said first and second pulleys together.

* * * * *